Oct. 12, 1937.    F. C. GLADECK    2,095,694
REMOVABLE SLICER FOR BREAD WRAPPING MACHINES
Filed Oct. 17, 1934    2 Sheets-Sheet 2
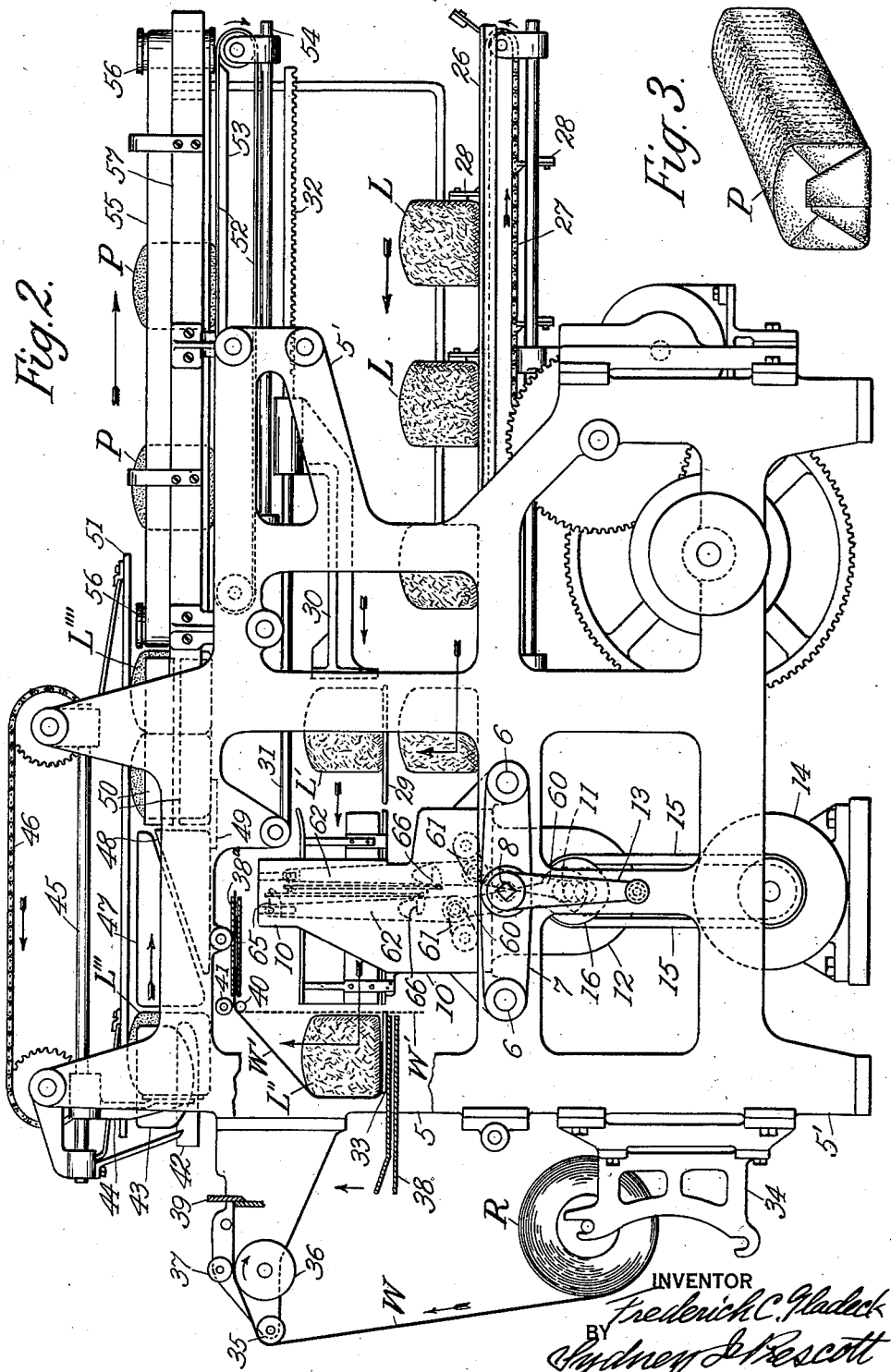
INVENTOR
Frederick C. Gladeck
BY Sydney J. Prescott
ATTORNEY Patented Oct. 12, 1937

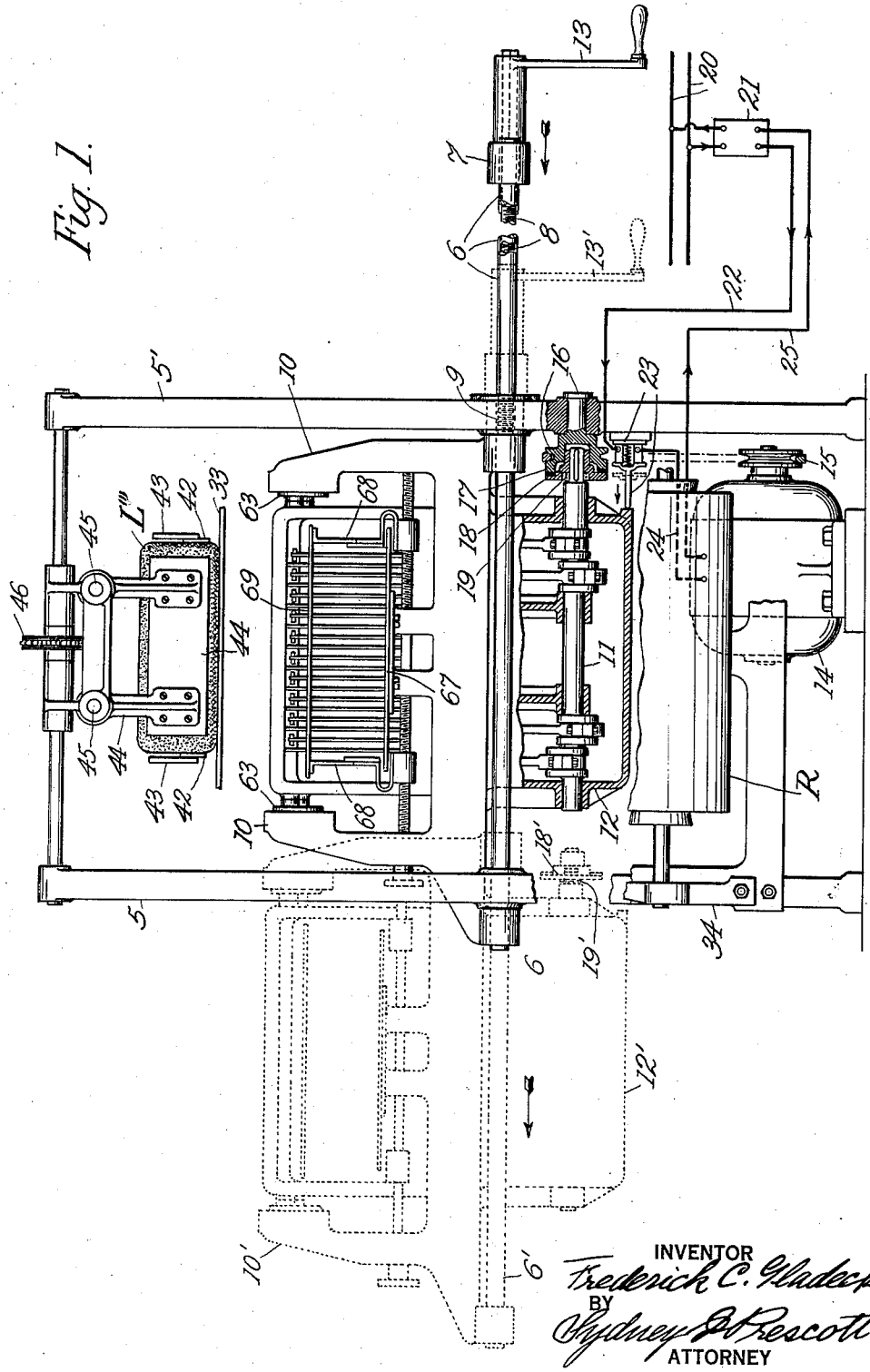

2,095,694

UNITED STATES PATENT OFFICE 2,095,694

REMOVABLE SLICER FOR BREAD-WRAPPING MACHINES

Frederick C. Gladeck, Brooklyn, N. Y., assignor to American Machine & Foundry Company, a corporation of New Jersey Application October 17, 1934, Serial No. 748,734

6 Claims. (Cl. 146—153)

This invention relates to an improvement in removable slicers for bread slicing and wrapping machines, its main object being to permit the slicer to be readily moved out of its operating position in the machine when it is desired to wrap the bread unsliced and automatically to stop the motor of the slicer unit upon moving the slicer out of operative position.

This object in the present invention is achieved by driving the slicer through a clutch, the movable member of which is mounted on the end of the slicer shaft while its stationary member is journaled in the frame of the wrapping machine and is driven by a belt from an electric motor supplied with current through a switch which is mounted on the frame of the wrapping machine and held in closed position by contact with the slicer when the latter is in operating position. Upon moving the slicer into non-operative position, the clutch is automatically disengaged and the motor-switch is opened, thereby stopping the motor. The act of moving the slicer back into operative position automatically re-engages the clutch and also re-establishes the motor circuit.

With this and other objects not specifically mentioned in view, the invention consists in certain constructions and combinations hereinafter fully described and then specifically set forth in the claims hereunto appended.

In the accompanying drawings which form a part of this specification and in which like characters of reference indicate the same or like parts:

Fig. 1 is an end elevation of a bread slicing and wrapping machine showing the slicer in operative and in non-operative positions;

Fig. 2 is a partial side elevation of the machine shown in Fig. 1 illustrating the passage of the loaves through the slicer and through the wrapping and sealing mechanisms; and Fig. 3 is a perspective view showing the appearance of a sliced loaf wrapped by the machine.

In carrying the invention into effect there is provided a slicer unit movable in and out of operative position, a stationary motor for driving said unit, and an electric circuit through said motor adapted to be closed by said slicer unit when the latter is at operative position. In the best constructions contemplated, there is provided a stationary clutch member driven from the motor, and the slicer unit includes a shaft carrying a clutch member arranged to engage the stationary clutch member when the slicer unit is at operative position. These various means and parts may be widely varied in construction for the particular device selected to illustrate the invention is but one of many possible concrete embodiments of the same. The invention, therefore, is not to be restricted to the specific construction shown and described.

Referring to Figs. 1 and 2 of the drawings, the side frames 5, 5' of the wrapping machine support a pair of horizontal slide-rods 6 which are connected at their outer ends by a bracket 7 carrying a screw shaft 8 engaging in a threaded bearing 9 mounted in side frame 5'. To the rods 6 is affixed the slicer frame 10 of the slicer unit from which the crank shaft 11 is suspended in a crank case 12 attached to the bottom of the slicer frame. Screw 8 on its squared extension carries a handle crank 13. By turning the crank 13, the rods 6 thus will be moved in or out, carrying the slicer frame 10 with them and thereby enabling the latter to be removed from the path of the loaf to the dotted position 10', when it is desired to wrap the loaves unsliced.

An electric motor 14 by means of a belt 15 drives a pulley 16 journaled in side frame 5' of the wrapping machine. The pulley 16 has axially projecting jaws 17 and constitutes the stationary member of a clutch, the movable member 18 of which is splined on the end of crank shaft 11 and provided with notches adapted to receive the jaws 17. A compression spring 19 seated against a shoulder on shaft 11 presses the clutch member 18 outwardly against a stop on shaft 11 while the clutch is disengaged, whereby if the notches of member 18 are out of registration with the jaws 17 while the clutch members are being engaged the member 18 will slide back on shaft 11 until registration occurs, whereupon it will snap into coupling position.

The cranks of the shaft 11 are linked by connecting rods 60 to arms 61 pivoted on the slicer frame 10 and connected to knife frames 62 provided with guide shoes 63 slidably mounted in the slicer frame. The slicing knives 64 are supported from their ends by lugs 65 and tension levers 66 of the knife frames. A slicing table 67 supported on the frame 10 is provided with slots receiving the slicer knives. A pair of side guards 68 connected by a top guard 69 serve to guide the loaf through the slicer knives.

The motor 14 is supplied with current from the power mains 20 through a circuit including a starting switch 21 connected by a lead 22 to one terminal of lock-switch 23, of conventional construction, attached to side frame 5' and having its other terminal connected to the motor by wire 24, the current flowing through the switch 23 to the motor and returning to the starter switch by a lead 25. The switch 23 is held closed by the crank case 11 of the slicer when the latter is in its operating position; when the slicer is moved out of this position a spring opens the switch 23 and thereby stops the motor.

The loaves L, Fig. 2, are fed into the machine on a runway 26 by means of a pair of spaced endless chains 27 carrying pusher fingers 28. Each loaf upon its arrival at the end of the runway is raised into position L' by a lifter plate 29. A slotted pusher 30 supported on slide rods 31 and intermittently operated by a rack 32 then forces the loaf through the slicer unit onto a vertically reciprocating lifter 33. Upon emerging from the slicer unit the sliced loaf engages a cut wrapper blank W' the ends of which are held in the guide channel 38 of lifter 33 and the stationary guide 38a whereby one side of the loaf is enfolded in the wrapper blank as it is delivered to the lifter 33. The wrapper web W is drawn from a reel R, which is supported in a frame 34 attached to side frames 5, 5', over a guide roller 35 by feed rollers 36, 37 which feed it into the guide channels 38 and 38a while the lifter 33 is in its elevated position. When a length of wrapper sufficient for one package has thus been fed a knife 39 is operated, thereby cutting the blank W' which is then drawn into the path of the loaf during the descent of the lifter 33. The wrapper then hangs down over the roller 40 in the dotted position shown in Fig. 2.

As the lifter 33 during its ascent carries the loaf into position L''', the wrapper is wiped over the top and other side of the loaf by roller 41, then the rearward side flaps are tucked in by tuckers 42, and the top flaps are folded down by engaging with folder plates 43. Pushers 44 guided on rods 45 and intermittently advanced by an endless chain 46 push the package into position L'''', its forward side flaps and its bottom flaps engaging with end folders 47 and 48 on the way and thereby completing wrapping of the package. The package is then heat sealed in the machine shown, which is used for wax paper wrapping, by contact with bottom heater plate 49 and end heater plates 50. While advancing from position L''' to L'''', the package is held down on the plate 49 by a top tension plate 51 resiliently suspended from the supports of the rods 45.

The pushers 44 deliver the finished packages P, which appear as shown in Fig. 3, onto an endless delivery belt 52, the upper loop of which is supported by a table 53 carried on support rods 54 which also support the outer pulley of belt 52. While being forwarded on the delivery belt, the ends of the packages are guided by a pair of vertical belts 55 running over flanged pulleys 56 turning in brackets attached to support bars 57. The belts 55 also serve to hold the end seams in place while cooling.

The wrapping machine in conjunction with which the present slicer unit has been illustrated is fully described in the copending application of Lester Ferenci, S. N. 594,101, filed February 19, 1932, and reference may be had to said application for a complete disclosure of the wrapping machine and the mounting of the slicer knives on the knife frames. It will be understood, however, that the present slicer unit may be used in other wrapping machines of widely different type, and is useful for slicing a great variety of other articles besides loaves of bread.

What is claimed is:

1. In a bread slicing device, the combination with means for feeding loaves to be sliced along a predetermined path, of a rotating driving element in fixed position, a slicer unit movable relative to said element into and out of article slicing position in said path, a clutch member driven from said element, said unit including a driven clutch member arranged to engage the first mentioned clutch member to be driven from the latter only when the slicing unit is at slicing position in the path of said loaves.

2. A bread slicing mechanism having means for forwarding sliced or unsliced loaves to a wrapping machine, comprising a bread slicing unit having sets of oppositely reciprocable slicer blades and rotatable devices for reciprocating said blades, means for feeding loaves along a predetermined path to said blades, means mounting said slicer unit for movement bodily into and out of slicing position in the path of the loaves forwarded by said feed to permit wrapping of sliced or unsliced bread loaves, a stationary driving member, an element driven by and supported in fixed relation to said driving member, said bodily movable unit including a cooperating element connected to said devices to drive the same and arranged to operatively engage the first mentioned element as a result of the movement of said unit into bread slicing position.

3. A bread slicing machine having means for feeding sliced or unsliced loaves to a wrapping machine, a bread slicing unit, rotatable devices for operating said slicer means for feeding loaves along a predetermined path to said slicing unit, means mounting said slicer unit for bodily movement into and out of slicing position in the path of the loaves forwarded by said feed to permit wrapping of sliced or unsliced bread loaves, a stationary motor, a clutch element driven by and supported in fixed relation to said motor, said bodily movable unit including a cooperating clutch element connected to said devices to drive the same and arranged to engage operatively said first mentioned clutch element when said unit is moved into bread slicing position, said motor being of the electrical type and having a switch in the motor circuit arranged to be operated by said bodily movement of said unit to prevent power operation of the slicer except when fully moved to slicing position.

4. In a loaf slicing machine, the combination with a loaf advancer for advancing loaves along a predetermined path, of a loaf slicer movable into and out of the path of advance of said loaves, said slicer comprising a plurality of elongated slicer blades, devices mounting said blades for endwise reciprocation, a shaft having eccentric portions, connections between said eccentric portions and said devices for reciprocating the blades as a result of rotation of said shaft, a driven element operatively connected to said shaft to drive the same, a driving element in fixed position, a stationary motor connected to said driving element to impart driving motion to the same, said driven and driving elements being arranged to cooperatively engage for driving the slicer as a result of the movement of the slicer into said path.

5. In a slicing machine, the combination with a loaf advancer for advancing loaves along a runway, of a loaf slicer movable into and out of the path of advance of said loaves, said slicer comprising a plurality of elongated slicer blades, devices mounting said blades for endwise reciprocation, a shaft having eccentric portions, connections between said eccentric portions and said devices for reciprocating the blades as a result of rotation of said shaft, a driven element operatively connected to said shaft to drive the same, a driving element in fixed position, a stationary motor connected to said driving element to impart driving motion to the same, said driven and driving elements being arranged to cooperatively engage for driving the slicer as a result of the movement of the slicer into said path, said driven element being mounted on one end of said shaft, means supporting said driving element in axial alignment with said driven element to engage and disengage by movement of the slicer, and said slicer being supported for movement in a direction parallel to the axis of the shaft.

6. In a bread slicer, the combination with means for feeding loaves to be sliced along a predetermined path, of a slicer unit having a plurality of spaced reciprocable slicing knives, mechanism mounting said slicer unit for movement transversely of said path into and out of operating position with the knives of said unit in the path of said loaves, means for reciprocating said knives including an electric motor, an electric circuit through said motor, and means mounted on said unit for closing said circuit when said unit is moved into said operating position.

FREDERICK C. GLADECK.